US006806952B1

(12) United States Patent
Kois

(10) Patent No.: US 6,806,952 B1
(45) Date of Patent: Oct. 19, 2004

(54) INSPECTION AND RETRIEVAL DEVICE

(76) Inventor: Bernard A. Kois, 38 Stambaugh, Girard, OH (US) 44420

(*) Notice: Subject to any disclaimer, the term of this patent is extended or adjusted under 35 U.S.C. 154(b) by 294 days.

(21) Appl. No.: 10/183,224

(22) Filed: Jun. 28, 2002

(51) Int. Cl.[7] .................................................. G01N 21/00

(52) U.S. Cl. ................................ 356/241.4; 356/241.5; 362/96; 137/147

(58) Field of Search ........................... 356/241.1–241.6; 362/96, 101; 137/147, 150

(56) References Cited

U.S. PATENT DOCUMENTS 4,050,107 A 9/1977 Parma
4,607,620 A * 8/1986 Storz .......................... 600/101
5,333,639 A 8/1994 Nelson
5,951,142 A 9/1999 Wang et al.
6,193,386 B1 2/2001 Reynolds

* cited by examiner

*Primary Examiner*—Richard A. Rosenberger
(74) *Attorney, Agent, or Firm*—Harpman & Harpman

(57) ABSTRACT

An inspection and retrieval device for vehicle fuel tanks comprising an elongated insertion tube having an end illumination source. A fuel pump in communication with the insertion tube defining a fuel path there through. An extensible gripping element extending from the insertion tube at its inlet and an illuminating source. A power source for the fluid pump and illumination source with interconnected control switches. The insertion tube is placed within a vehicle fuel filled tank and the illumination source is activated. The inspection tube can be maneuvered within the tank for visual inspection. Foreign objects can be engaged by the gripping element and removed while foreign liquid in the tank can be pumped out by activation of the fluid pump.

12 Claims, 5 Drawing Sheets

INSPECTION AND RETRIEVAL DEVICE

BACKGROUND OF THE INVENTION

1. Technical Field

This invention is related to inspection and liquid transfer devices for use in hostile environments and more specifically for illuminate inspection of vehicle fuel tanks filled with fuel. Such devices provide for removal of foreign objects and fluids within the tanks without tank removal or draining.

2. Description of Prior Art

Prior art devices of this type have relied on a variety of different inspection tools and combinations, see for example U.S. Pat. Nos. 4,050,107, 5,333,639, 5,951,142 and 6,193,386.

In U.S. Pat. No. 4,050,107 a tool for truck operators can be seen having an elongated hollow body member with an extensible depth gauge extending therefrom for insertion into a fuel tank.

U.S. Pat. No. 5,333,639 is directed to an illuminated siphon having independent siphon tube and pump bulb with a separate light source to one side of the siphon tube for insertion and inspection and removal of foreign liquid from a fuel tank.

An adjustable illuminating retrieval apparatus is claimed in U.S. Pat. No. 5,951,142 having a support tube with a light source and adjustable reflective surface on the tube's end.

U.S. Pat. No. 6,193,386 discloses an illuminated telescopic inspection and pickup tool having an extensible rod with a mirror adjustably positioned on its end and a light within the handle portion allowing the light to be projected and reflected by the mirror allowing for visual inspection at obtuse angles.

SUMMARY OF THE INVENTION

An inspection and retrieval device to be used in vehicle fuel tanks filled with fuel. The device combines a liquid and solid removal and retrieval element having a single insertable flexible tubular member with a light source. A fuel pump converts the support and deployment-tubing member into a liquid transferred conduit with a remote activated grappling element deployable from within the tubing member. The point of use light source emanates from within the deployed end of the tubular member allowing for visual inspection within the fuel filled tank and confirmation of foreign liquid and removal by the pump upon activation.

DESCRIPTION OF THE PREFERRED EMBODIMENT

Figure 1:
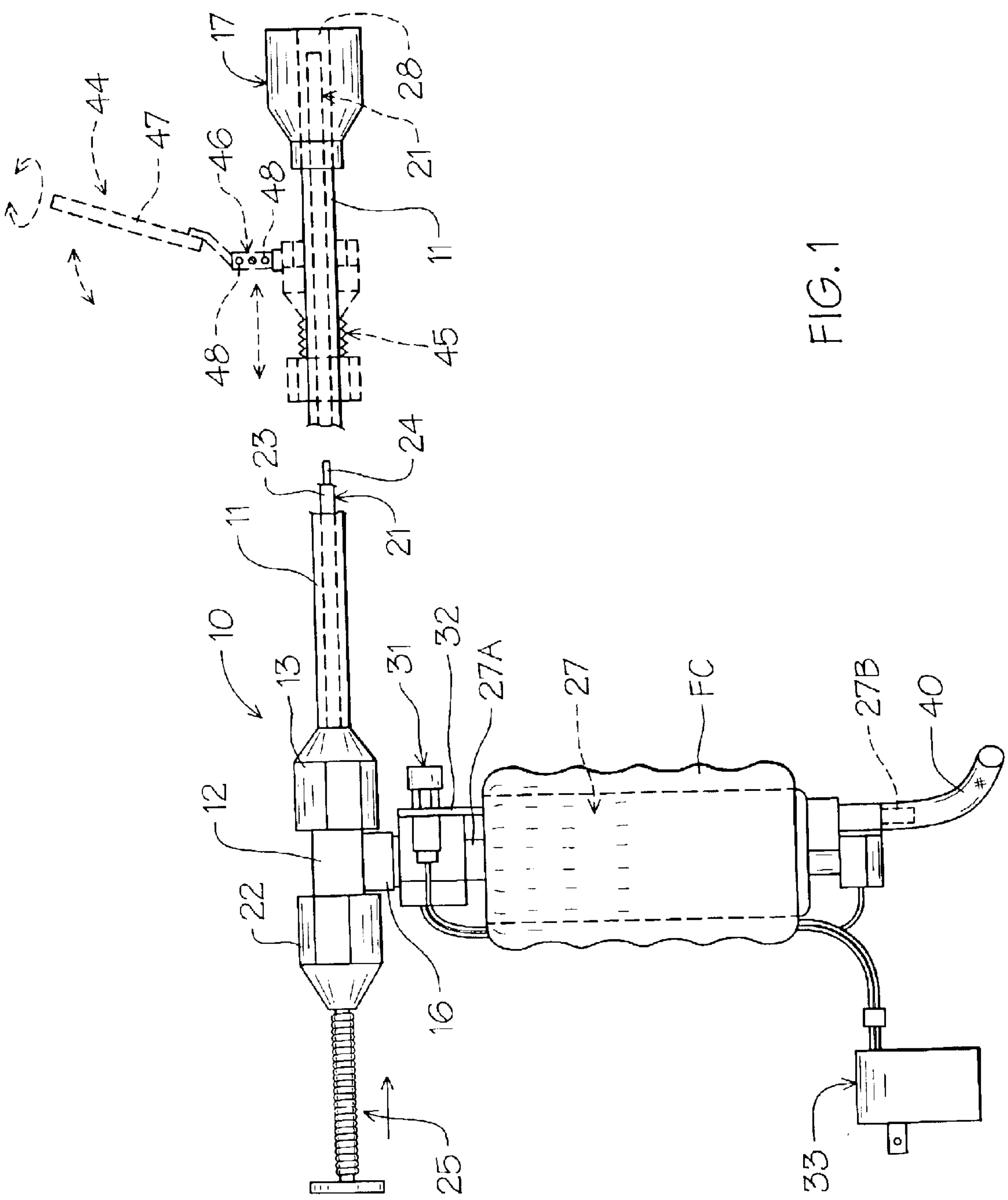
FIG. 1 is a side elevational view with portions broken away of the inspection and retrieval device.
Figure 2:
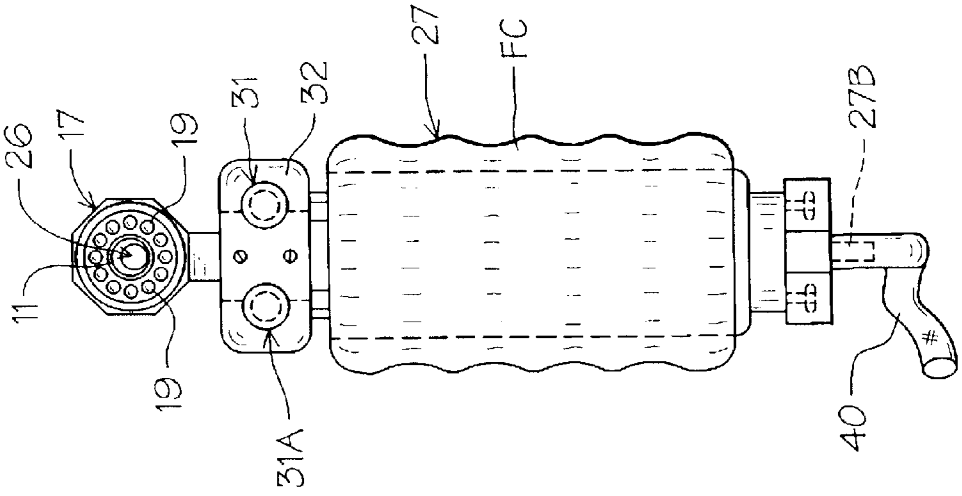
FIG. 2 is an end elevational view of the present invention.
Figure 3:
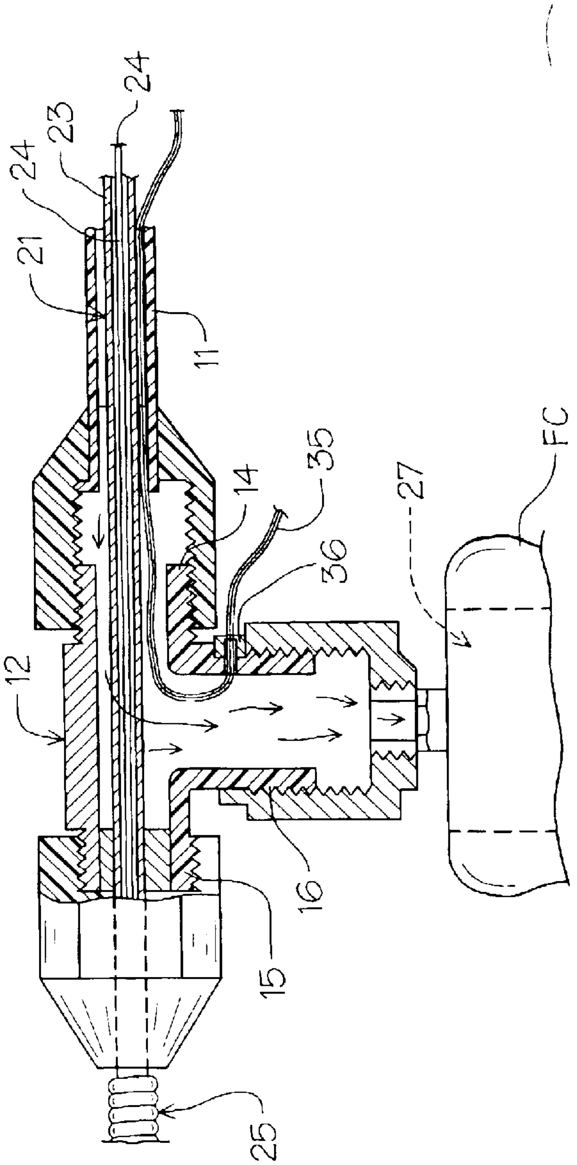
FIG. 3 is an enlarged partial cross-sectional view with portions broken away of the present invention.
Figure 7:
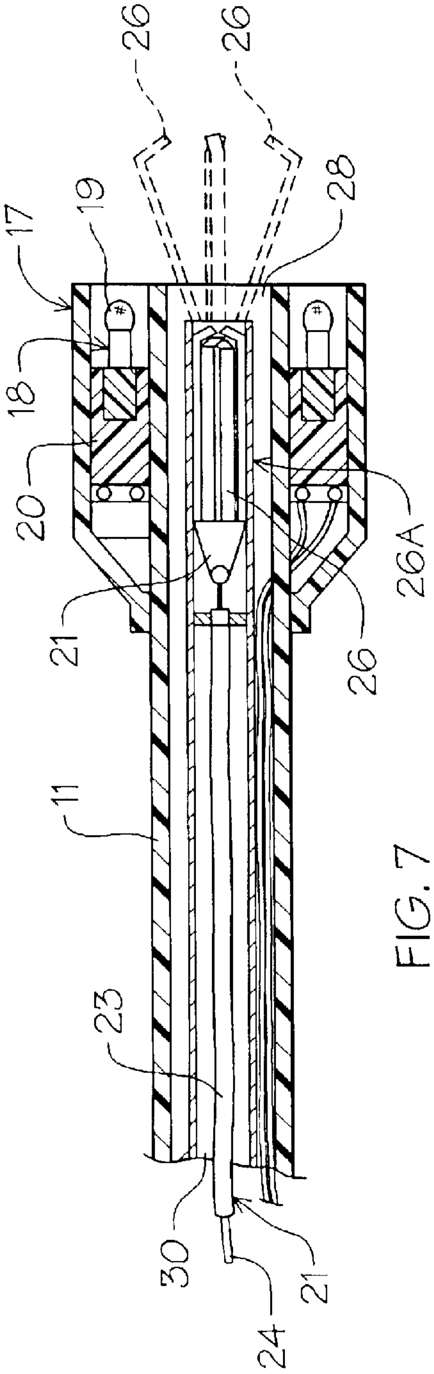
FIG. 7 is an enlarged cross-sectional view of the deployment end of the present invention with engagement elements being deployed in broken lines.
Figure 8:
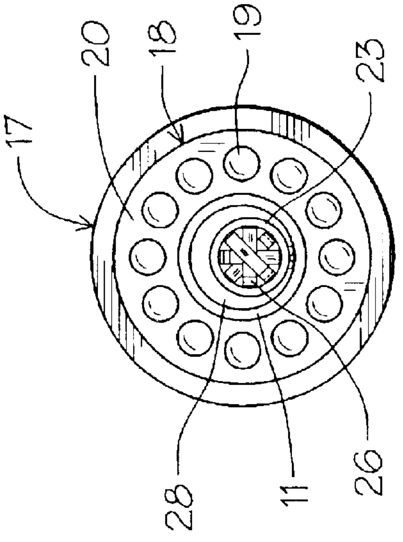
FIG. 8 is an enlarged end view of the deployment end of the invention.

Referring to FIGS. 1–3 of the drawings, an inspection retrieval device 10 of the invention can be seen having an elongated flexible support tube 11 extending from an inner engagement fitting 12. The support tube 11 is preferably made of flexible synthetic resin material and is secured to the inner engagement fitting 12 by a threaded coupling 13. The inner engagement fitting 12 has a main T-shaped body member with an inlet fitting 14 and multiple outlet fittings 15 and 16. The support tube 11 has an inspection head 17 on its free end with a multiple light array 18 within. The light array 18 is made up of a plurality of annularly spaced high intensity light bulbs 19 interconnected by a multiple socket fitting 20, best seen in FIG. 7 of the drawings. A remotely deployable spring gripping device 21 extends through the support tube 11 and the respective inlet fitting 14 and outlet fitting 15 secured thereto by a threaded coupling 22, best seen in FIG. 3 of the drawings. The gripping device 21 has an elongated sheath 23 with an activation cable 24 extending therein. A spring plunger assembly 25 interengages the cable 24 which on its oppositely disposed end within the inspection head 17 has multiple gripping elements 26 as best seen in FIG. 7 of the drawings. The gripping elements 26 are deployable from the end of a fitting 26A within the sheath 23 and are of spring material so that by depressing the plunger assembly 25 they extend outwardly and radially allowing them to open around a foreign object and upon release of the spring urged plunger assembly 25 grasp the object by retraction as is well known and understood by those skilled in the art.

A fluid pump 27 is in communication with the outlet 16 of the interengagement fitting 12 via a threaded adapter 28. The fluid pump 27 is a common commercially available unit manufactured by Borg Warner, model EP20, 12 volt having an inlet 27A and an outlet 27B. The pump 27 is covered with a resilient foam cover FC. The pump 27 creates a negative pressure inlet 28 in the open end of the support tube 11 in which a fluid conduit 30 is formed therearound the sheath 23 of the gripping device 21, as best seen in FIGS. 3 and 7 of the drawings.

Referring now to FIGS. 1 and 2 of the drawings, the pump 27 is activated by a switch element 31 on a mounting plate 32 positioned on top of the pump 27 with a source of power 33 which in this example is a 12 volt transformer for use with a standard domestic 110 volt AC current. Alternately the pump 27 may be directly connected to the electrical system of a vehicle 34 on which it is to be used as will be described in detail hereinafter.

A second switch element 31A provides power to the hereinbefore described lighter ray 18 via a power cable 35 that enters the interengagement fitting 12 by a gasket inlet 36 and extends through the length of the support tube 11 within the fluid conduit 30 to the light array 18 as best seen in FIGS. 3 and 7 of the drawings.

Figure 6:
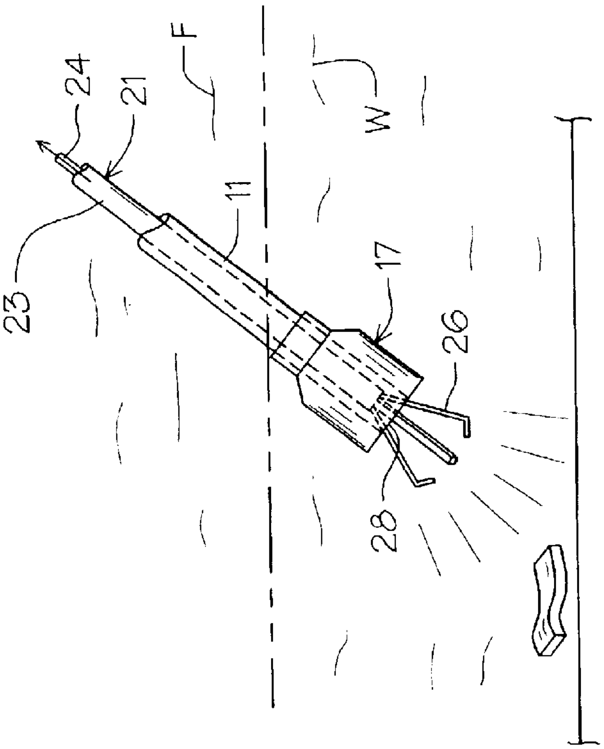
FIG. 6 is an enlarged perspective view of the insert end of the invention in use within a fuel filled tank.
Figure 5:
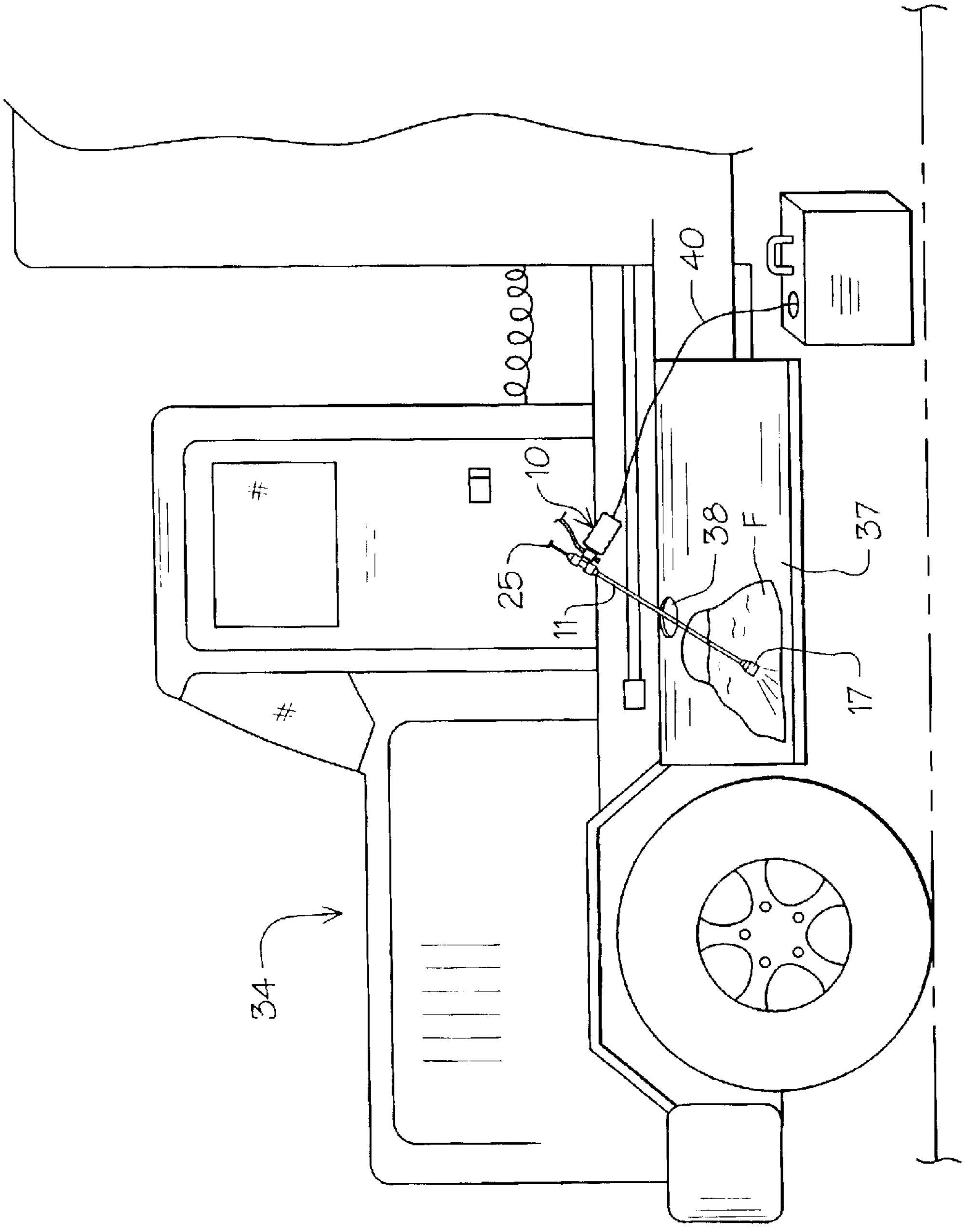
FIG. 5 is a graphic illustration of the invention in use being inserted into a fuel tank of a vehicle with portions broken away.

Referring now to FIGS. 5 and 6 of the drawings, the inspection and retrieval device 10 of the invention is shown in use with the vehicle 34, (a truck) having an outboard fuel tank 37. The inspection retrieval device 10 is connected to the power source 34 and the support tube 11 is inserted within the fuel filled tank 37 via a refueling opening 38 within. The light source 18 is switched on via the switch element 31A illuminating the inside of the tank 37 in the fuel F. If a foreign object 39 is detected, the gripper device 21 can be deployed as illustrated in FIG. 6 engaging the foreign object 39 for retrieval.

Liquid contaminant such as water W, if present, will be at the bottom of the tank and can be removed by activation of the pump 27 via the switch 31. The water W is drawn up through the inspection head 17 through the fluid conduit 30 into the fluid pump 27 via the pump's inlet at 27A and out through the pump outlet 27B and an outlet flow hose 40 to a holding/disposal tank 41 as best seen in FIG. 5 of the drawings.

Figure 4:
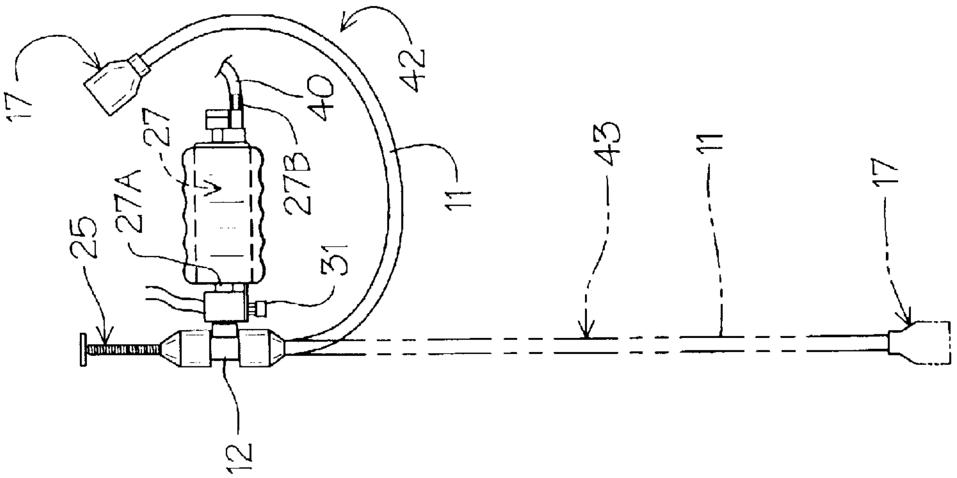
FIG. 4 is a graphic illustration of the present invention in storage with extended use position shown in broken lines.

It is noted that due to the flexible memory nature of the support tube 11, it can be bent into a storage transportation position illustrated at 42 in FIG. 4 of the drawings in solid lines and then be re-configured to its original shape illustrated at 43 in broken lines.

It will be evident from the above description that the respective threaded couplings 13, 22 and adapter 28 are all fluid tight to maintain the vacuum needed to pump fluid there through.

Referring back now to FIG. 1 of the drawings, an alternate inspection mirror assembly 44 can be seen in broken lines detachably secured to the support tube 11 by a repositionable sleeve 45. The mirror assembly 44 has a pivoted bracket arm assembly 46 with a mirror element 47 secured to its end by a ball swivel joint 48. This will allow the user, not shown, to reposition the arm 46 and position the mirror element 47 at different angular inclination to the longitudinal axis of the support tube 11 to provide further visual inspection capabilities within the tank when deployed.

Thus it will be seen that a new and novel inspection retrieval device has been illustrated and described and it will be apparent to those skilled in the art that various changes and modifications may be made thereto without departing from the spirit of the invention.

I claim:

1. An inspection and retrieval device for use in vehicle fuel tanks for the removal of foreign objects and fluid contaminants, said inspection retrieval device comprises an elongated flexible support tube, an inspection head secured at one end of said tube, a light source within said inspection head, an extensible mechanical gripper within said tube, a fluid conduit formed about said mechanical gripper within said tube, a fluid pump means in communication with said support tube and said fluid conduit, a fluid outlet extending from said pump, a power source for said fluid pump and said light source, switch means interconnecting said fluid pump and said light source with said power source and means for interconnecting and communication between said support tube and said pump means.

2. The inspection retrieval device set forth in claim 1 wherein said light source comprises a plurality of high intensity light bulbs extending axially about said flexible support tube.

3. The inspection retrieval device set forth in claim 1 wherein said mechanical gripper comprises, a containment sheath, an activation cable within said sheath, a plurality of resilient gripping elements interconnected to one end of said cable, and resilient plunger means interconnected to said remaining end of said cable.

4. The inspection retrieval device set forth in claim 1 wherein said switch means comprises a first element switch in communication with said light source and a second electrical switch element in communication with said fluid pump.

5. The inspection retrieval device set forth in claim 1 wherein said means for interconnecting and communication between said supply tube and said fluid pump comprises, an inner engagement fitting having multiple inlet ports and outlet ports.

6. The inspection retrieval device set forth in claim 5 wherein said inlet ports and outlet ports of said inner engagement fitting have sealing couplings thereon defining a fluid transfer chamber between said support tube and a fluid pump inlet on said fluid pump.

7. The inspection retrieval device set forth in claim 5 wherein said inner engagement fitting, sealing couplings and said support tubes are formed from a material resistant to degradation by fuel.

8. The inspection retrieval device set forth in claim 7 wherein said sealing couplings are threadably secured to said interconnection fitting.

9. The inspection retrieval device set forth in claim 1 wherein said inspection head is adhesively secured to said support tube.

10. An inspection and retrieval device comprises, an elongated flexible support tube, a light array at one end of said tube, a gripper assembly within said tube, a fluid conduit about said gripper assembly within said tube, a fluid pump in communication with said fluid conduit, a mirror adjustably positioned on said support tube, a power source for said fluid pump and said light array, independent switch means interconnecting to said respective fuel pump and said light array and said power source.

11. The inspection and retrieval device set forth in claim 10 wherein said gripper assembly comprises, a containment sheath, an activation cable within said sheath, a plurality of resilient gripping elements interconnected to one end of said cable, and a spring plunger deployment means connected to the opposite end of said cable.

12. The inspection and retrieval device set forth in claim 10 wherein said switch means comprises, a first electrical switch in communication with said light array and a second electrical switch in communication with said fuel pump and said power source.

* * * * *